(12) United States Patent
Esmailzadeh

(10) Patent No.: US 6,285,663 B1
(45) Date of Patent: Sep. 4, 2001

(54) INCREASING PERFORMANCE IN COMMUNICATIONS BY EMBEDDING ONE SIGNAL IN ANOTHER SIGNAL

(75) Inventor: Riaz Esmailzadeh, Kawasaki (JP)

(73) Assignee: Telefonaktiebolaget LM Ericsson (publ) (SE)

( * ) Notice: Subject to any disclaimer, the term of this patent is extended or adjusted under 35 U.S.C. 154(b) by 0 days.

(21) Appl. No.: 09/092,381

(22) Filed: Jun. 5, 1998

(51) Int. Cl.[7] ....................................... H04Q 7/00
(52) U.S. Cl. ..................... 370/311; 370/522; 370/527
(58) Field of Search ..................... 370/522, 527, 370/311; 499/522

(56) References Cited

U.S. PATENT DOCUMENTS

| 5,056,109 | 10/1991 | Gilhousen et al. | 375/1 |
|---|---|---|---|
| 5,570,353 | 10/1996 | Keskitalo et al. | 370/18 |
| 5,604,765 * | 2/1997 | Bruno et al. | 375/200 |
| 5,621,723 | 4/1997 | Walton, Jr. et al. | 370/18 |
| 5,697,053 | 12/1997 | Hanly | 455/33.1 |
| 5,862,160 * | 1/1999 | Irvin et al. | 371/53 |

FOREIGN PATENT DOCUMENTS

| 9616492 | 5/1996 | (WO) | H04J/3/06 |
|---|---|---|---|
| 9715164 | 4/1997 | (WO) | H04Q/7/38 |
| 9813951 | 4/1998 | (WO) | H04B/7/00 |

* cited by examiner

*Primary Examiner*—Melvin Marcelo
(74) *Attorney, Agent, or Firm*—Jenkens & Gilchrist, A Professional Corporation

(57) ABSTRACT

In transmitting communication signals to a receiver via a transmission channel, the transmitter generates a composite signal including information from which the receiver can determine a channel evaluation signal and other control information. The composite signal is transmitted over the transmission channel. This results in improved channel capacity, reduced power transmission requirements, and reduced interference in the transmission channel.

30 Claims, 8 Drawing Sheets

INCREASING PERFORMANCE IN COMMUNICATIONS BY EMBEDDING ONE SIGNAL IN ANOTHER SIGNAL

FIELD OF THE INVENTION

The invention relates generally to improving performance in communications and, more particularly, doing so by embedding one signal in another signal.

BACKGROUND OF THE INVENTION

FIG. 1 illustrates an example of a conventional wireless communication system. In the example of FIG. 1, a base station 11 communicates bidirectionally with a plurality of mobile stations 13 via radio signals passing through a transmission channel 15. Such an arrangement is typical of cellular telecommunications systems and other wireless communications systems. The transmission technology can be any of a variety of conventional technologies, for example, code division multiple access (CDMA), time division multiple access (TDMA), and frequency division multiple access (FDMA).

FIG. 2 is a block diagram which illustrates an example of a conventional transceiver 21 which may be included in each of the mobile stations 13 and the base station 11 of FIG. 1. The transceiver 21 transmits radio signals over the transmission channel 15 to other communication stations, and receives radio signals via transmission channel 15 from other communication stations. The transceiver 21 includes a transmitter 17 and a receiver 19. A conventional transmitter processing apparatus at 12 provides various signals to a conventional transmit section 14 which interfaces the signals from the transmitter processing apparatus 12 to an antenna 20 that transmits corresponding radio signals over the transmission channel 15. The antenna 20 also receives radio signals from the transmission channel 15 and provides them to a receive section 16 which converts the signals received from antenna 20 into signals which are input to a conventional receiver processing apparatus at 18.

The transmitter processing apparatus at 12 produces the substantive information, that is, the message to be communicated over the transmission channel to a receiving communication station, and also provides control signals such as pilot symbols, power control information and other control signals. Substantive information, pilot symbols, power control information and other control information are also received from the transmission channel 15 and provided from receive section 16 to receiver processing apparatus 18.

The power control information or power control symbols (often referred to as TPC (Transmission Power Control) bits) are regularly transmitted in order to compensate for changes in the transmission channel between the transmitting and receiving stations, such as fading. Pilot symbols are transmitted to help the receiver estimate the channel and carry out coherent detection of received signals. The pilot symbols transmitted by the transmitter are already known in advance at the receiver, so that the receiver can evaluate channel conditions by comparing the pilot symbols actually received to the expected pilot symbols.

The pilot symbols and power control symbols constitute a significant part of the non-information signals communicated over the transmission channel. Moreover, these signals require significant transmission power. The pilot and power control symbols are conventionally transmitted either in the same physical channel as the substantive information, or in a control channel which is separate from the information channel. Both the power control and pilot symbols can be transmitted in either the uplink or downlink directions of the system illustrated in FIG. 1. In conventional CDMA systems such as specified in IS-95, up to 20% of the total transmitted power is used for pilot symbol transmission, and the power control symbols constitute up to 10% of the total symbols transmitted over the channel. These figures are typical of other conventional CDMA systems such as the "Code Division Testbed" (CODIT), and the wideband CDMA standards being developed in Japan and Europe.

FIG. 3 illustrates one example of the transmission of pilot symbols and power control symbols in the transmission channel of a wireless communications system. The illustration in FIG. 3 is an example of the transmission of pilot symbols and power control symbols over a physical channel which is separate from the physical channel used for transmission of substantive information signals. Regardless of whether the pilot symbols and power control symbols are transmitted over a separate channel or over the same channel as the substantive information signals, the present invention recognizes that any reduction in the amount of pilot symbols and/or power control symbols to be transmitted will result in a corresponding increase in available channel capacity, a corresponding decrease in required transmission power, and a corresponding decrease of interference over the transmission channel.

It is therefore desirable to provide for one or more of: increased available channel capacity; decreased transmission power; and decreased interference; while also providing for transmission and receipt of all desired pilot symbols and power control information.

The present invention provides for transmitting and receiving all desired pilot symbols and power control information while improving upon conventional systems with respect to one or more of: the required channel capacity; the required transmission power; and the transmission channel interference. This is achieved by embedding the power control information in the pilot symbols.

The aforementioned advantages of the present invention can also be achieved by embedding in the pilot symbols control information other than power control information. Moreover, the aforementioned technique of embedding control information in a channel evaluation signal (i.e., the pilot symbols) can also be advantageously applied in wireline communication systems as well as wireless ones.

DETAILED DESCRIPTION

Figure 1:
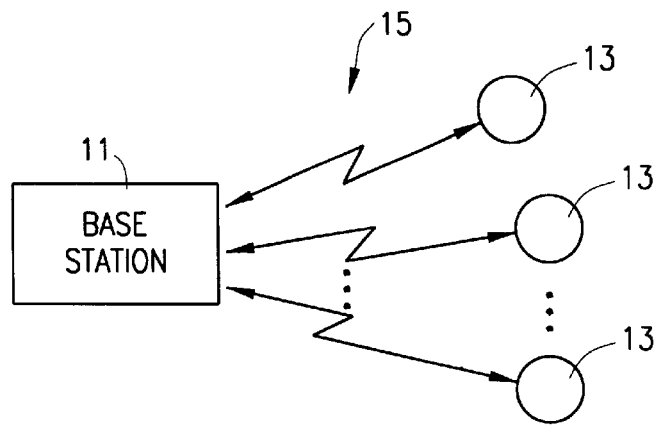
FIG. 1 illustrates one example of a conventional wireless communications system in which the present invention may be implemented.
Figure 2:
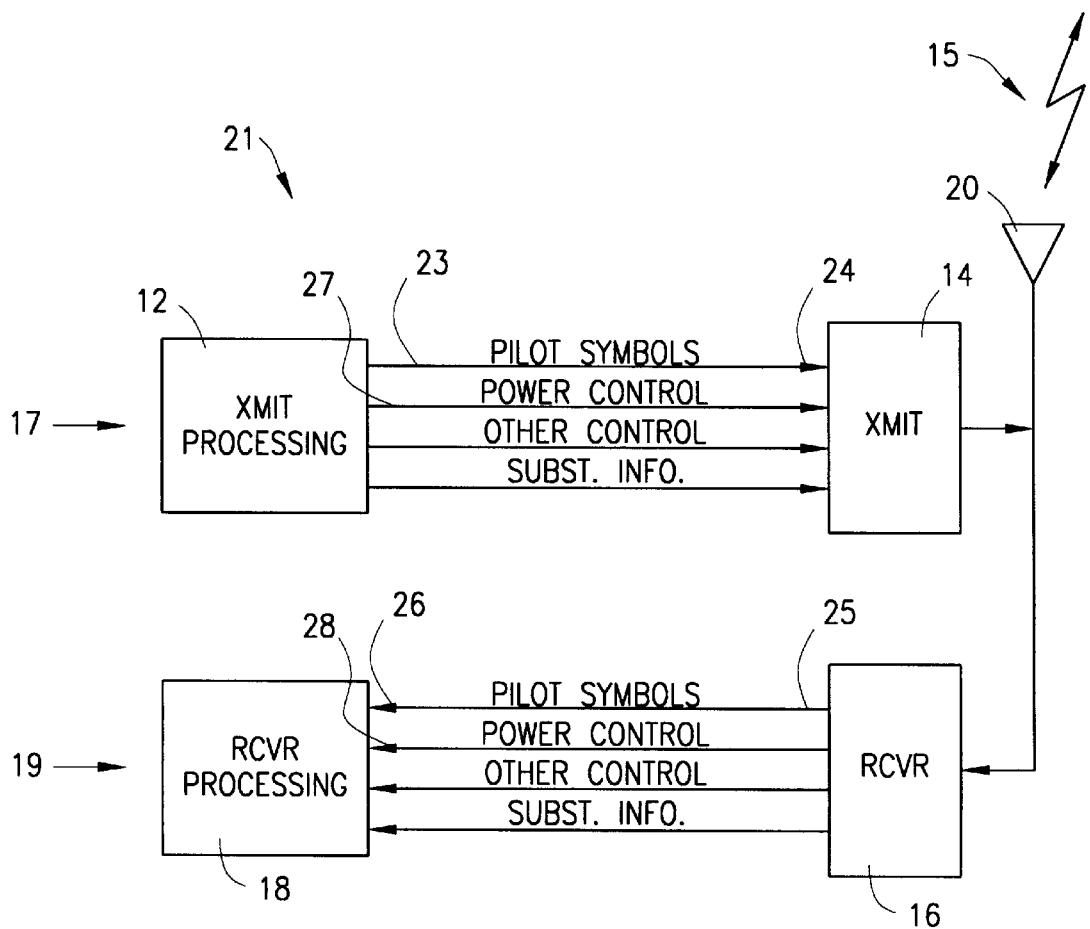
FIG. 2 illustrates an example of a conventional transceiver which may be used in the communication stations of FIG. 1.
Figure 4:
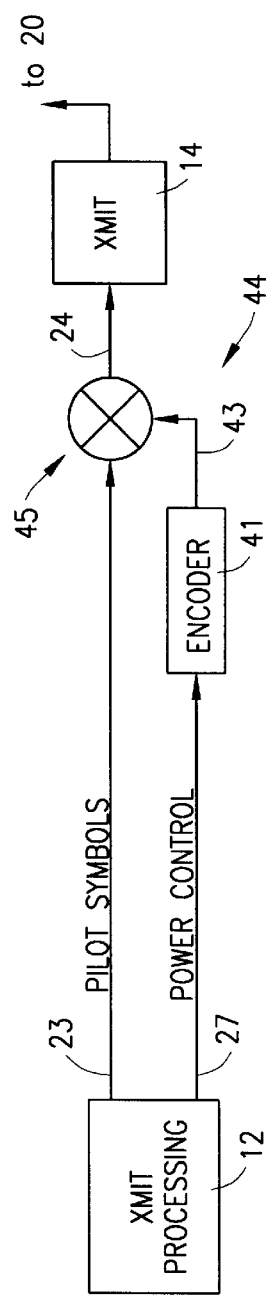
FIG. 4 illustrates an example of a transmitter according to the present invention for use in a transceiver of a wireless communication system.
Figure 5:
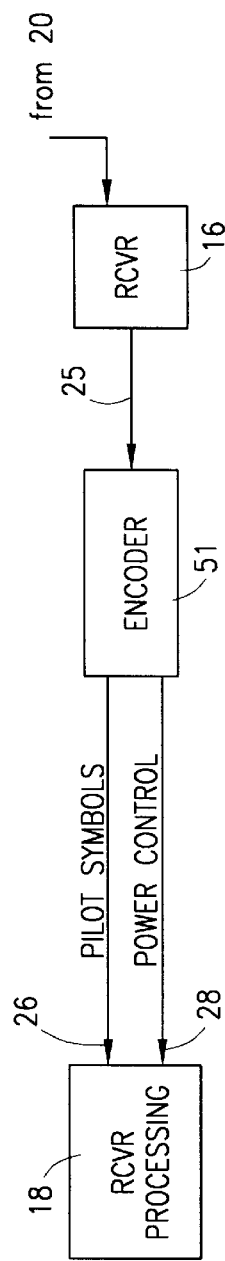
FIG. 5 illustrates an example of a receiver according to the present invention for use in a transceiver of a wireless communication system.

Example FIGS. 4 and 5 respectively illustrate examples of a transmitter and a receiver according to the present invention for use in communication stations of a wireless communications system, for example in the transceivers of the mobile stations and base station of FIG. 1. The example transmitter of FIG. 4 includes a composite signal generator 44 coupled between the transmit section 14 and the transmit processing section 12 of FIG. 2. The composite signal generator 44 produces a composite signal including information about the conventional pilot symbols and power control symbols received from conventional outputs 23 and 27 of conventional transmitter processing section 12. The composite signal generator 44 includes an encoder 41 for encoding power control symbols which are conventionally output at 27 from the transmitter processing section 12. The encoder 41 assigns a code to represent the power control information and outputs this code at 43. The encoded power control information at 43 is then used to modulate the pilot symbols which are conventionally output at 23 from the transmitter processing section.

A modulator 45 receives as inputs the pilot symbols from output 23 and the encoded power control information 43. The encoded power control information 43 is used to modulate the pilot symbols from output 23, and the output from modulator 45 is connected to conventional input 24 of the transmit section 14. The composite signal represents the pilot symbols modulated by power control information, so the power control information is embedded in the pilot symbol information. The transmit section 14 processes the composite signal at input 24 in the same conventional manner that it processes the pilot symbols conventionally received from output 23 of transmit processing section 12 in prior art FIG. 2.

The power control information conventionally output at 27 from the transmitter processing apparatus 12 typically will indicate either that the transmitting power needs to be increased or decreased, that is, power up or power down. The transmitter processing apparatus 12 conventionally selects either power up or down in response to current channel conditions. Because power control symbols are not actually transmitted, the apparatus 12 need only provide at 27 an indication of power up or power down, rather than an actual power control symbol. In any event, encoder 41 can provide the information 43 as described below.

Figure 3:
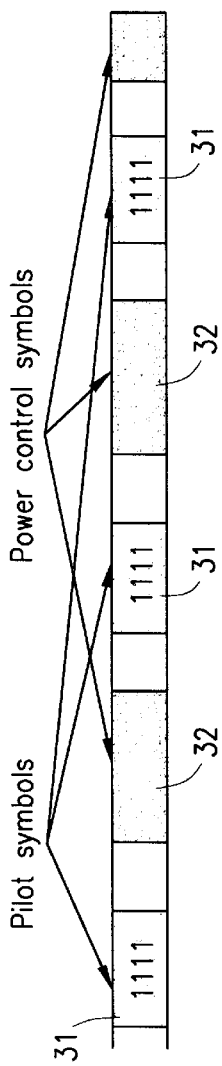
FIG. 3 illustrates diagrammatically the transmission of pilot symbols and power control symbols on a separate control channel in a conventional wireless communication system.
Figures 10, 11:
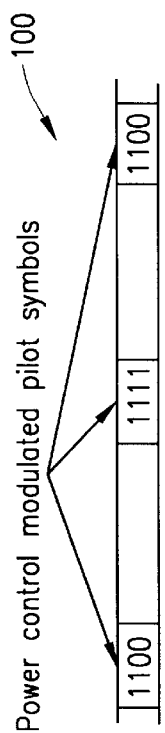
FIG. 10 shows numerical examples of the operation of the transmitter and receiver of FIGS. 4–6.
FIG. 11 illustrates an example of a composite signal including pilot symbol information and power control information according to the invention.

Using FIG. 3 as an example, because each unit 31 of pilot information includes four pilot symbols, namely 1111 in FIG. 3, the encoder 41 in this example provides at 43 a power control information code including four symbols to be modulated at 45 with the four pilot symbols. Columns 111 and 112 of FIG. 10 illustrate the output 43 of encoder 41 in response both a "power up" and "power down" indication at the output 27 of transmitter processing section 12. In particular, if the conventional output 27 indicates "power up", then the encoder 41 outputs 1111, and if the output 27 indicates "power down", then the encoder output 43 is 1100. It will be noted that the "up" code 1111 is orthogonal to the "down" code 1100. This orthogonal relationship facilitates better performance in demodulating the modulated (composite) signal at the receiver, as will be seen below. Column 113 of FIG. 10 shows the composite signals output from modulator 45 and received at input 24 of the transmit section 14 when the up (1111) and down (1100) codes at 43 (see columns 111 and 112) are used to modulate pilot symbols. Two different examples of pilot symbols are shown in FIG. 10, namely, 1111 and 0000. The 0's in FIG. 10 represent −1's.

The example receiver of FIG. 5 receives the composite signal from the air interface 15 via antenna 20. The receive section 16 processes the composite signal in the same conventional manner that it processes conventional pilot symbols in prior art FIG. 2. An extractor 51 has an input connected to the conventional pilot symbol output 25 of the conventional receive section 16. The extractor 51 extracts the original pilot symbols and the original power control information from the composite signal output at 25 from the receive section 16. The extractor 51 outputs the original pilot symbols to the receiver processing section 18 at the input 26 conventionally used to receive pilot symbols in FIG. 2. The extractor 51 provides conventional power control symbols to the input 28 that conventionally receives power control symbols (see FIG. 2).

Figure 6:
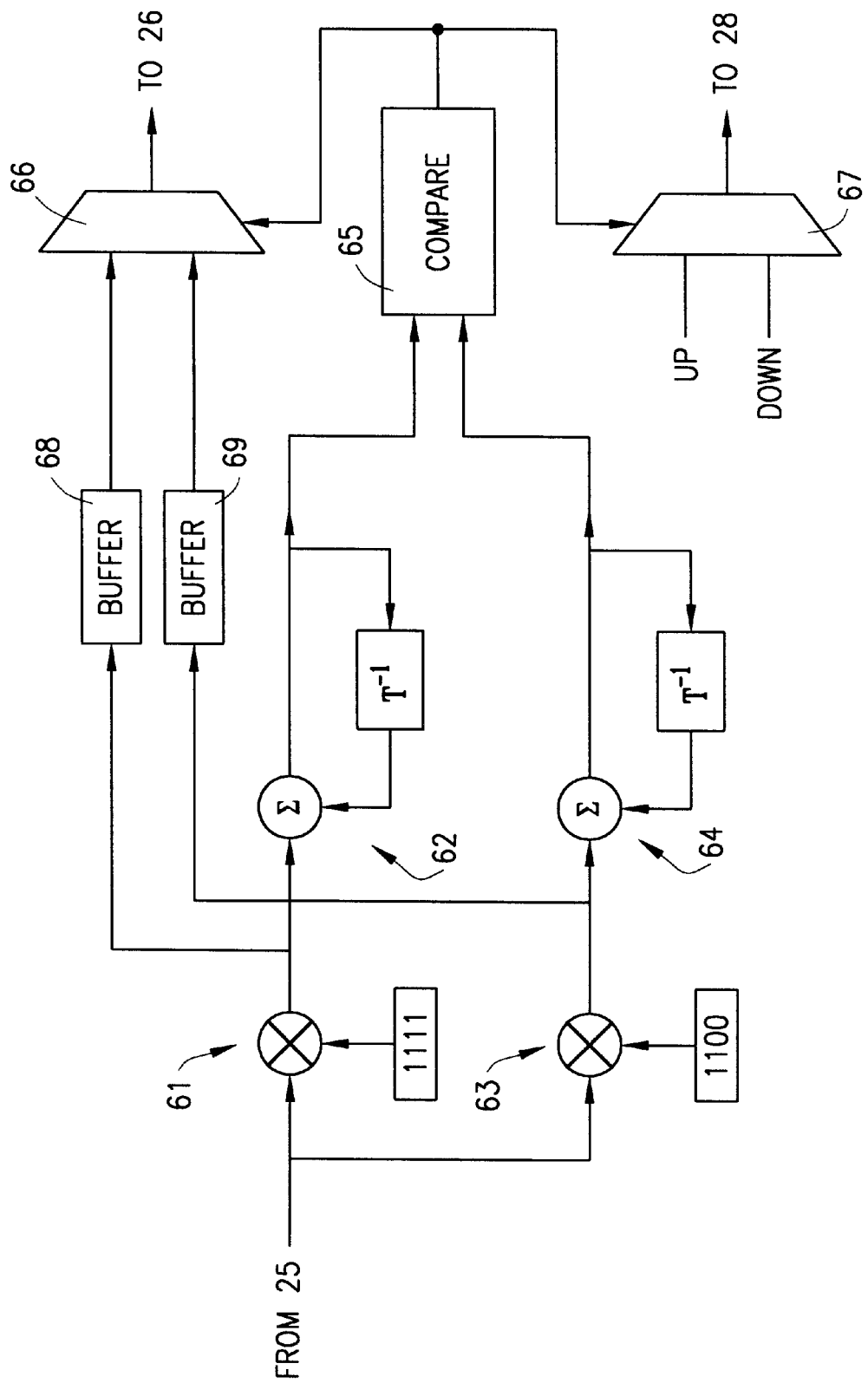
FIG. 6 illustrates an example implementation of the extractor of FIG. 5.

FIG. 6 illustrates an example implementation of the extractor 51 of FIG. 5. In the example extractor of FIG. 6, the composite signal received from the output 25 of receive section 16 is applied to a pair of demodulators 61 and 63. Referencing again columns 111 and 112 of FIG. 10, it can be seen that the demodulator 61 also receives the "power up" code 1111 with which to demodulate the modulated pilot symbols. Similarly, the demodulator 63 receives the "power down" code 1100 with which to demodulate the modulated pilot symbols. The respective outputs of the demodulators 61 and 63 are coupled to respective accumulators 62 and 64. Each accumulator calculates the sum of the demodulated pilot symbols output from the associated demodulator. The symbol $T^{-1}$ in the feedback loop of each accumulator 62 and 64 represents a delay of one symbol time, so that, as each pilot symbol is received, it can be appropriately added to the partial sum currently stored in the accumulator.

Referencing now column 114 and 116 of FIG. 10, these columns respectively illustrate the outputs of demodulators 61 and 63 when the modulated pilot symbols (i.e., composite signals) of column 113 are received at the respective inputs of demodulators 61 and 63. For example, the modulated pilot symbols 1100 at row 119, column 113 will result in an output of 1100 from demodulator 61 in column 114, but will result in an output of 1111 from demodulator 63 in column 116. As shown at row 119, column 115, the 1100 output from demodulator 61 is summed at accumulator 62 to provide a result of 0, the 0's in the 1100 representing −1's. Similarly, row 119, column 117 of FIG. 10 indicates that the 1111 output from demodulator 63 accumulates to a sum of 4 in accumulator 64. Because the power up code 1111 is orthogonal to the power down code 1100, the outputs from accumulators 62 and 64, as illustrated in FIG. 10, are ideally maximally different from one another. Although orthogonal codes probably provide optimal performance, other suitable codes can be used to practice the invention.

If, as in the above-described example, the accumulator 64 produces a sum value larger in magnitude than the accumulator 62, then this indicates that the power down code 1100 of demodulator 63 was produced by encoder 43 and used at modulator 45 to modulate the pilot symbols. Conversely, if the accumulator 62 accumulates a larger magnitude sum, then this indicates that the power up code 1111 of demodulator 61 was produced by encoder 43 and used at modulator 45 to modulate the pilot symbols. Row 118 of FIG. 10 illustrates an example where the 1111 power up code (see row 118, column 112) is used to modulate the pilot symbols. The sum accumulated at 62 is 4 (row 118, column 115) and the sum accumulated at 64 is 0 (row 118, column 117).

Referencing again FIG. 6, a magnitude comparator 65 coupled to accumulators 62 and 64 compares the magnitude of the respective sums calculated by the accumulators, and controls selectors 66 and 67 accordingly. When the accumulator 62 has the larger sum, then the output of the magnitude comparator selects a conventional power up symbol to be passed through selector 67 to input 28 of the receiver processing section 18, and selects the contents of buffer 68 to be passed through selector 66 to input 26 of receiver processing section 18. Conversely, if the sum accumulated by accumulator 64 is larger than the sum accumulated by accumulator 62, then the output of magnitude comparator 65 selects a conventional power down symbol to be passed through selector 67 to the input 28 of receiver processing section 18, and selects the contents of buffer 69 to be passed through selector 67 to input 26 of the receiver processing section 18.

The buffers 68 and 69 are provided to buffer the outputs of demodulators 61 and 63 until magnitude comparator 65 can determine, from the sums accumulated at 62 and 64, which of demodulators 61 and 63 has output the original pilot symbols. That is, demodulator 61 will output the original pilot symbols if the power up code 1111 was used to modulate the pilot symbols in the transmitter, and demodulator 63 will output the original pilot symbols if the power down code 1100 was used to modulate the pilot symbols in the transmitter. Thus, demodulators 61 and 63 respectively define power up and power down branches. These branches together indicate to the comparator 65 which power control code was used to modulate the original pilot symbols, and which demodulator has output the original pilot symbols. When the sum from accumulator 62 is larger than that from accumulator 64, then the power up symbol is selected at 67 and the output of demodulator 61 (in buffer 68) is selected at 66, whereas the power down symbol and the output of demodulator 63 (in buffer 69) are selected at 67 and 66, respectively, if the sum from accumulator 64 is the larger of the two sums. Thus, magnitude comparator 65 and selectors 66 and 67 form an overall selector which responds to the accumulators 62 and 64 by making the appropriate selections at 66 and 67.

Figure 6A:
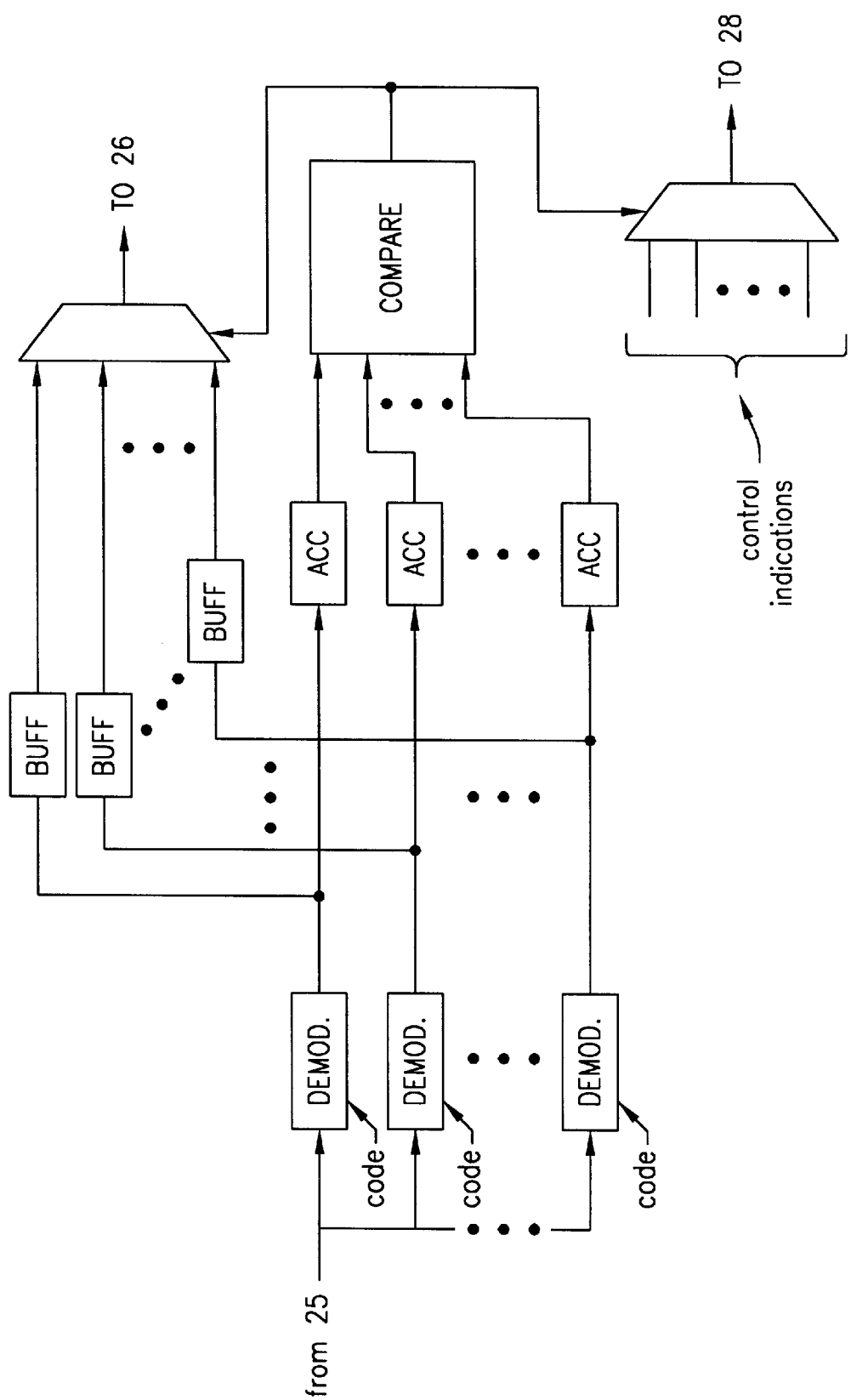
FIG. 6A illustrates another example of the extractor of FIG. 5.

Any desired pair of codes (optimally orthogonal codes) can be used to modulate/demodulate the pilot symbols. Also, any desired number of codes (i.e., more than two codes) can be used to provide higher resolution power control than just power up and power down. Such higher resolution would of course require additional modulator/accumulator branches such as those shown at 61–62 and 63–64, namely one additional modulator/accumulator branch for each additional code beyond the two illustrated in FIG. 6. This is illustrated in the example extractor of FIG. 6A. In this example, the comparator 65 will select the branch having the largest magnitude sum in its accumulator.

Figure 7:
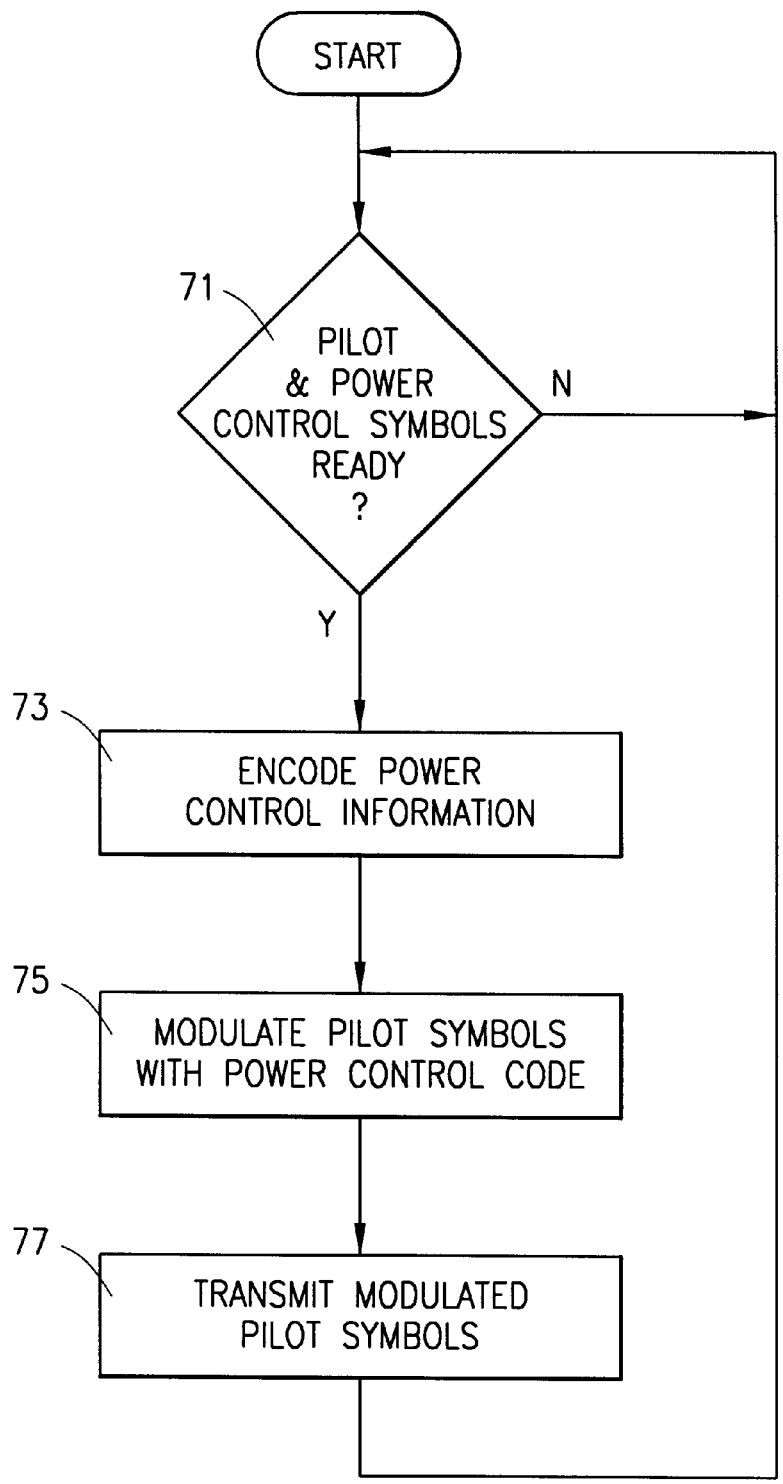
FIG. 7 is a flow diagram which illustrates an example of the operation of the transmitter of FIG. 4.

FIG. 7 illustrates the operation described above with respect to the example transmitter of FIG. 4. It is first determined at 71 whether the pilot and power control symbols are ready from the transmitter processing section 12. When the pilot and power control symbols are ready, the power control symbol information is encoded at 73 using encoder 41. Thereafter at 75, the pilot symbols output at 23 from transmitter processing section 12 are modulated at 45 with the power control code 43 output from encoder 41. Thereafter, the modulated pilot symbols are transmitted across the air interface in conventional fashion at 77, and control returns to await the arrival of more pilot and power control symbols at 71.

Figure 8:
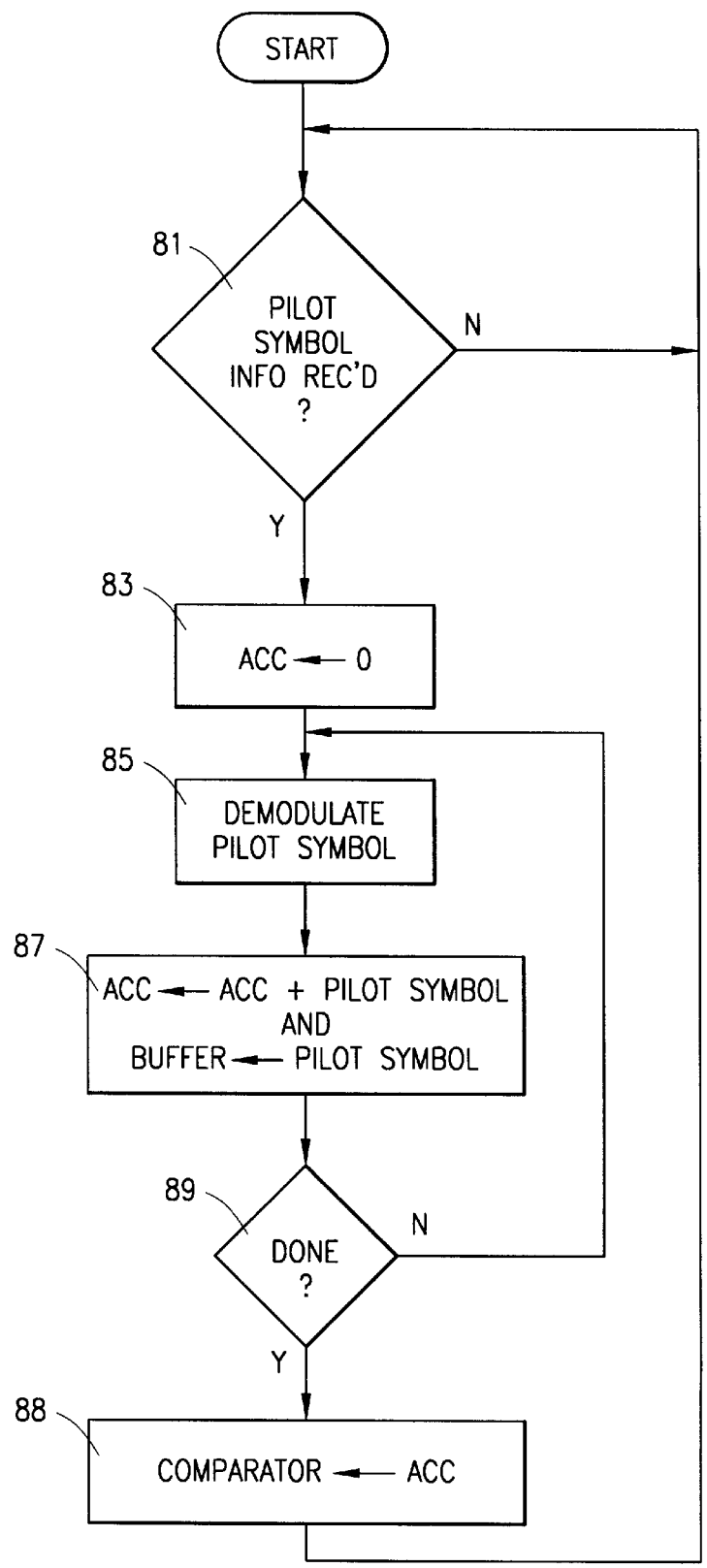
FIG. 8 is a flow diagram which illustrates exemplary operations of the extractor of FIGS. 5 and 6.

FIG. 8 illustrates the operation described above with respect to the demodulate/accumulate branches of FIG. 6. Taking the branch of modulator 61 and accumulator 62 as an example, when the pilot symbol information has been received (81) from the output 25 of receive section 16, then the accumulator 62 is zeroed at 83, and the demodulator 61 attempts to demodulate the first pilot symbol at 85. Thereafter at 87, the pilot symbol output from the demodulator 61 is added to the contents of the accumulator 62, and is also stored in the buffer 68. Thereafter, the steps 85 and 87 are repeated until the demodulator 61 has performed its demodulating operation on all of the received pilot symbols. When it is determined at 89 that the demodulator 61 has operated on all received pilot symbols, then at 88 the contents of the accumulator 62 are provided to the magnitude comparator 65, and control returns to await the arrival of more pilot symbol information at 81. Although the operation of FIG. 8 has been described with respect to the power up branch of demodulator 61, accumulator 62 and buffer 68, the operation of FIG. 8 is of course equally applicable to the power down branch of demodulator 63, accumulator 64 and buffer 69.

Figure 9:
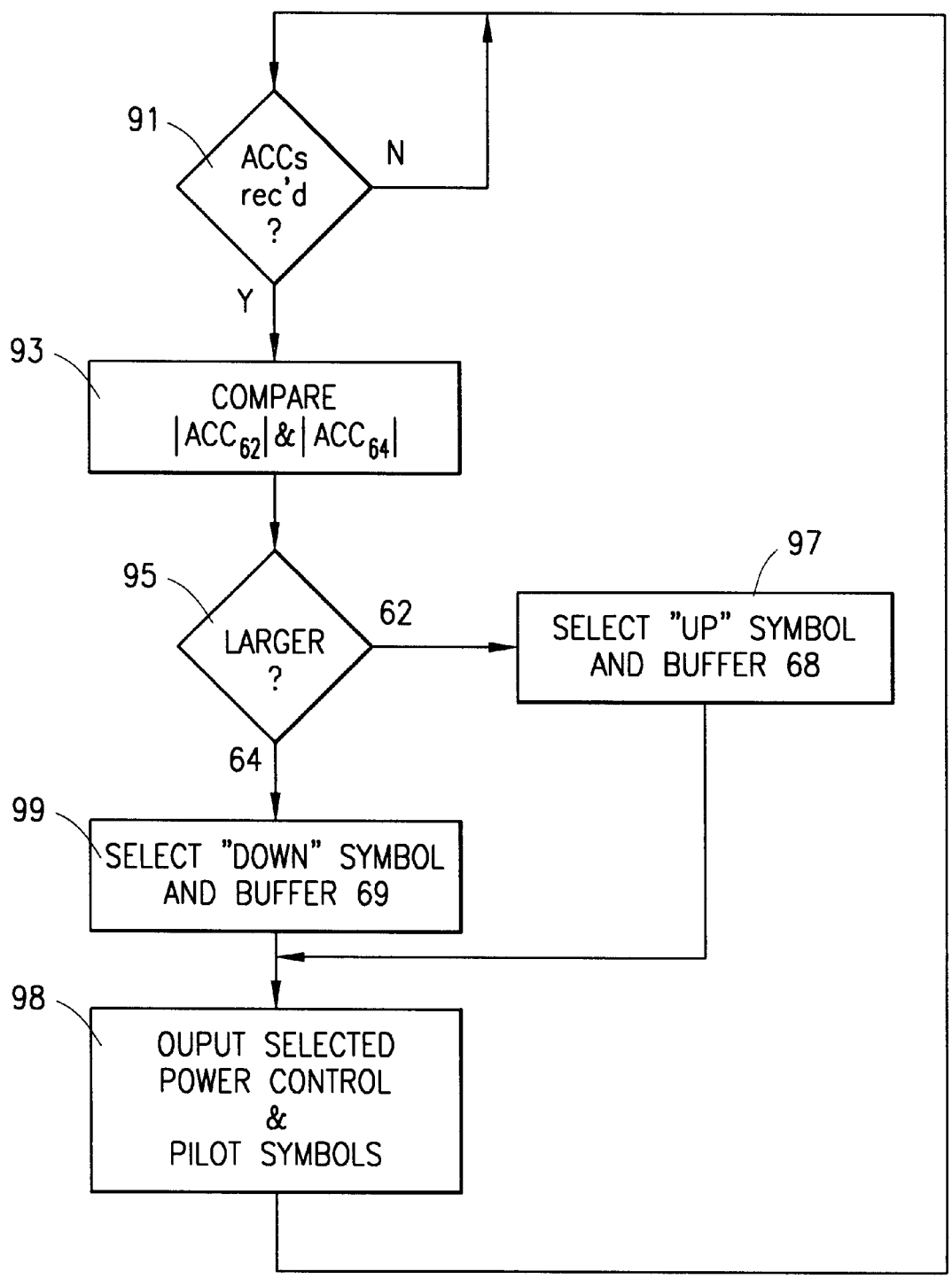
FIG. 9 is a flow diagram which illustrates further exemplary operation of the extractor of FIGS. 5 and 6.

FIG. 9 illustrates the selection operation of the magnitude comparator 65 and multiplexers 66 and 67 to provide the desired power control and pilot symbols to the inputs 26 and 28 of the receiver processing section 18. It is first determined at 91 whether the contents (sums) of the accumulators 62 and 64 have been received. If so, then at 93 the magnitude comparator 65 compares the magnitude of the contents of accumulator 62 with the magnitude of the contents of accumulator 64. If the contents of accumulator 62 are larger at 95, then at 97 the comparator 65 selects the up symbol at multiplexer 67 and selects buffer 68 at multiplexer 66. If the contents of accumulator 64 are larger at 95, then at 99 the comparator 65 selects the down symbol at multiplexer 67 and selects buffer 69 at multiplexer 66. After the appropriate selections at the multiplexers have been made at 98, the selected power control symbol from multiplexer 67 and the selected pilot symbols from multiplexer 66 are provided to the respective inputs 28 and 26 of the receiver processing section 18. Thereafter, the magnitude comparator 65 awaits at 91 the next arrival of sums from accumulators 62 and 64.

It will be evident to workers in the art that the embodiments described above relative to FIGS. 4–10 can be readily implemented as improvements in hardware, software or a suitable combination thereof, in those portions of conventional wireless communications transceivers that process pilot symbols and power control symbols.

Because the power control symbol information is embedded in the pilot symbol information to produce a composite signal according to the invention, there is no need to transmit any power control symbol information, so the power control symbols shown at 32 in FIG. 3 can be removed from the transmission, thus permitting the above-stated goals of increased available channel capacity (i.e., less transmission time over the transmission channel), decreased transmission power and decreased interference to be achieved. The composite signal 100, including all pilot symbol and power control symbol information, is illustrated in FIG. 11. As seen by comparison to FIG. 3, the composite signal has exactly the same effect on the channel as do the FIG. 3 pilot symbols, but the composite signal of FIG. 11 carries both pilot symbol and power control symbol information.

Although the examples described above involve embedding power control information in pilot symbols in a wireless communication system, the invention can also be used for embedding in pilot symbols other types of control information such as frame rate information, voice codec information, chip rate information, commands to update position coordinates, etc. Furthermore, the above-described techniques of the invention are also applicable in wireline communications systems. Many conventional wireline communications systems such as, for example, modems utilize signaling called training sequences. These training sequences are used in wireline systems to perform transmission channel evaluation functions analogous to those for which pilot symbols are used in wireless systems. Thus, the training sequences are similarly available to have embedded therein other control information used in wireline systems.

Although exemplary embodiments of the present invention have been described above in detail, this does not limit the scope of the invention, which can be practiced in a variety of embodiments.

What is claimed is:

1. A transmitter for transmitting communication signals to a receiver via a transmission channel, comprising:
   an apparatus for providing a channel evaluation signal and other control information which are to be used by the receiver;
   a composite signal generator having an input coupled to said apparatus to receive said channel evaluation signal and said other control information, said signal generator being operable to embed said other control information exclusively in said channel evaluation signal, said composite signal generator having an output responsive to said channel evaluation signal and said other control information to produce a composite signal including composite information from which the receiver can determine said channel evaluation signal and said other control information; and
   a transmit interface coupled to said output of said composite signal generator for interfacing between said composite signal generator and the transmission channel.

2. The transmitter of claim 1, wherein said composite signal generator includes a modulator coupled to said input to receive said channel evaluation signal, and an encoder coupled to said input to receive said other control information, said encoder having an output for providing encoded control information representative of said other control information, said modulator coupled to said encoder output for modulating said channel evaluation signal with said encoded control information to produce said composite signal, said modulator coupled to said composite signal generator output to provide thereto said composite signal.

3. The transmitter of claim 1, wherein said composite signal requires less transmission time over the transmission channel than would be needed to transmit said channel evaluation signal and said other control information as separate signals.

4. The transmitter of claim 1, wherein said composite signal requires less transmission power than would be needed to transmit said channel evaluation signal and said power control information as separate signals.

5. The transmitter of claim 1, wherein said composite signal creates less interference in the transmission channel than would be created by transmitting said channel evaluation signal and said power control information as separate signals.

6. The transmitter of claim 1, wherein the transmission channel includes a CDMA transmission channel of a cellular telecommunications system.

7. The transmitter of claim 1, wherein the transmission channel is a radio channel and said channel evaluation signal includes pilot symbols used to evaluate the radio channel.

8. The transmitter of claim 7, wherein said other control information includes power control information used in controlling transmission power in the radio channel.

9. A receiver for receiving communication signals from a transmitter via a transmission channel, comprising:
   an extractor having an input to receive a composite signal which was produced by the transmitter and which includes information indicative of a channel evaluation signal and other control information to be used by the receiver, said extractor including an output coupled to said input for providing said channel evaluation signal and said other control information in response to said composite signal, said extractor further including a plurality of demodulators coupled to said input and also coupled to respective demodulating codes for demodulating said composite signal with each of said demodulating codes, said demodulating codes respectively indicative of a plurality of control indications possibly included in said other control information; and
   a receive interface coupled to said extractor input for interfacing between said extractor and the transmission channel.

10. The receiver of claim 9, wherein said extractor includes accumulators respectively coupled to said demodulators to calculate respective sums in response to output signals received from the respective demodulators.

11. The receiver of claim 10, wherein said extractor includes a selector having an input coupled to said accumulators to receive therefrom said sums and responsive to said sums for providing said channel evaluation signal and said other control information, said selector coupled to said extractor output to provide thereto said channel evaluation signal and said other control information.

12. The receiver of claim 11, wherein said extractor includes a plurality of buffers respectively coupled to said demodulators to receive therefrom and store the respective demodulator output signals, wherein one of said demodulator output signals includes said channel evaluation signal, and wherein said selector compares said sums and provides a control output responsive to said comparison for indicating which of the demodulator output signals in said buffers includes said channel evaluation signal.

13. The receiver of claim 9, wherein the transmission channel includes a CDMA transmission channel of a cellular telecommunications system.

14. The receiver of claim 9, wherein the transmission channel is a radio channel and said evaluation signal includes pilot symbols used to evaluate the radio channel.

15. The receiver of claim 14, wherein said other control information includes power control information used in controlling transmission power in the radio channel.

16. A method of transmitting communication signals to a receiver via a transmission channel, comprising:
   providing a channel evaluation signal and other control information to be used by the receiver; and
   generating in response to the channel evaluation signal and the other control information a composite signal in which said other control information is embedded exclusively in said channel evaluation signal, and from which the receiver can determine the channel evaluation signal and the other control information.

17. The method of claim 16, wherein said generating step includes modulating said channel evaluation signal with encoded information representative of said other control information.

18. The method of claim 16, including sending said composite signal to the receiver via the transmission channel using less transmission time over the transmission channel than would be needed to send said channel evaluation signal and said other control information as separate signals.

19. The method of claim 16, including sending the composite signal to the receiver via the transmission channel using less transmission power than would be needed to send said channel evaluation signal and said other control information as separate signals.

20. The method of claim 16, including sending said composite signal to the receiver via the transmission channel, wherein said sending step creates less interference in the transmission channel than would be created by sending said channel evaluation signal and said other control information as separate signals.

21. The method of claim 16, wherein the transmission channel includes a CDMA transmission channel of a cellular telecommunications system.

22. The method of claim 16, wherein the transmission channel is a radio channel and said channel evaluation signal includes pilot symbols used to evaluate the radio channel.

23. The method of claim 22, wherein said other control information includes power control information used in controlling transmission power in the radio channel.

24. A method of operating a receiver to receive communication signals from a transmitter via a transmission channel, comprising:

receiving a composite signal produced by the transmitter and including information indicative of a channel evaluation signal and other control information to be used by the receiver; and demodulating said composite signal with respective demodulating codes, wherein said demodulating codes are indicative of plurality of control indications possibly included in the other control information, in order to extract the channel evaluation signal and the other control information from the composite signal.

25. The method of claim 24, wherein said extracting step includes calculating respective sums in response to respective output signals produced in said step of demodulating said composite signal with respective demodulating codes.

26. The method of claim 25, wherein said extracting step includes providing the channel evaluation signal and the other control information in response to said sums.

27. The method of claim 26, wherein said extracting step includes storing respective output signals produced by said step of demodulating said composite signal with respective demodulating codes, said providing step including determining from a comparison of said sums that one of said stored output signals includes said composite signal, and selecting said one stored output signal.

28. The method of claim 24, wherein the transmission channel includes a CDMA transmission channel of a cellular telecommunications system.

29. The method of claim 24, wherein the transmission channel is a radio channel and said channel evaluation signal includes pilot symbols used to evaluate the radio channel.

30. The method of claim 29, wherein said other control information includes power control information used in controlling transmission power in the radio channel.

* * * * *

UNITED STATES PATENT AND TRADEMARK OFFICE
CERTIFICATE OF CORRECTION

PATENT NO. : 6,285,663 B1
DATED : September 4, 2001
INVENTOR(S) : Riaz Esmailzadeh It is certified that error appears in the above-identified patent and that said Letters Patent is hereby corrected as shown below:

<u>Title page,</u>
Item [75], delete "Riaz Esmailzadeh, Kawasaki (JP)" insert -- Riaz Esmailzadeh, Yokohama (JP) --

Signed and Sealed this

Sixth Day of August, 2002

*Attest:*

*Attesting Officer*

JAMES E. ROGAN
*Director of the United States Patent and Trademark Office*